(No Model.) 4 Sheets—Sheet 1.

T. BAUER.
COKE OVEN.

No. 513,257. Patented Jan. 23, 1894.

Witnesses:
Klas N. Ternstedt
J. J. Malle.

Inventor:
Theodor Bauer,
by A. Faber du Faur Jr.
Attorney.

(No Model.)  4 Sheets—Sheet 2.
T. BAUER.
COKE OVEN.
No. 513,257.  Patented Jan. 23, 1894.
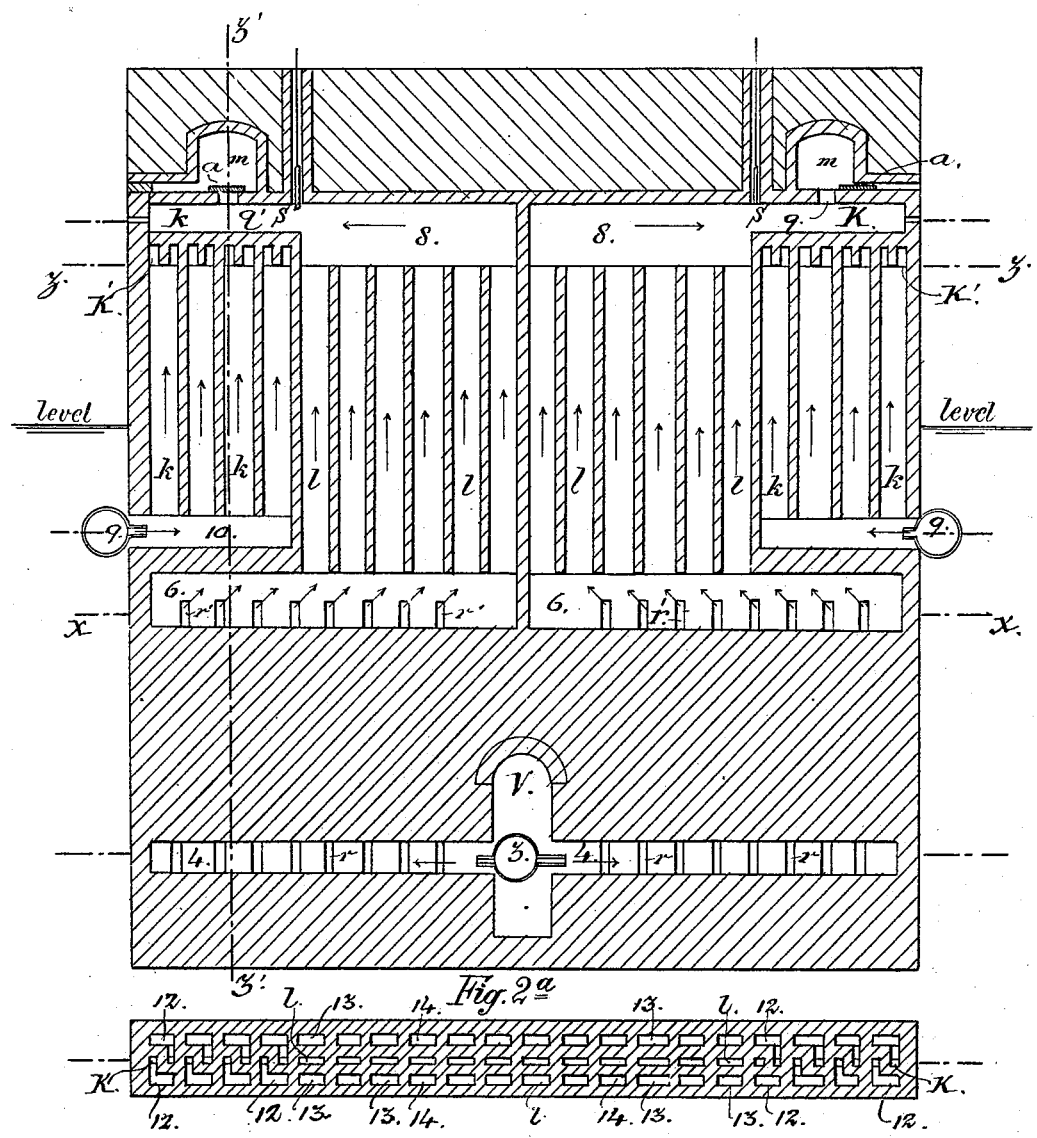

(No Model.) 4 Sheets—Sheet 3.
T. BAUER.
COKE OVEN.
No. 513,257. Patented Jan. 23, 1894.
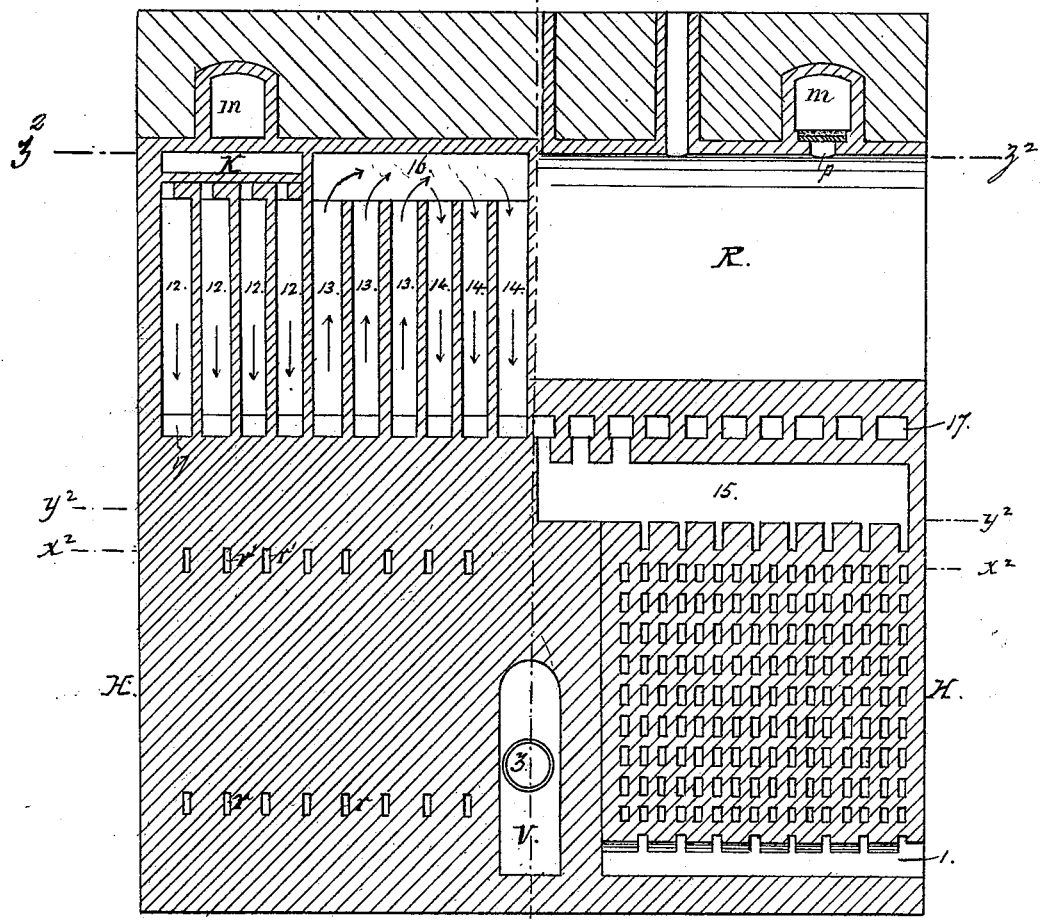
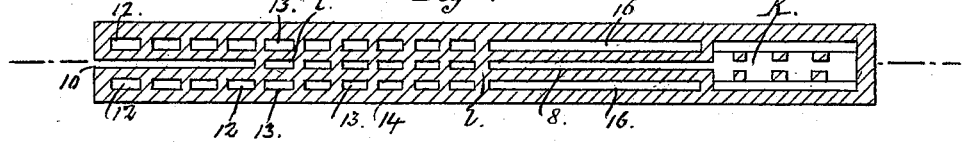
Witnesses:
Klas A. Pernstedt
J. J. Malle.
Inventor:
Theodor Bauer,
by A. Faber du Faur Jr.
Attorney.

(No Model.) 4 Sheets—Sheet 4.

T. BAUER.
COKE OVEN.

No. 513,257. Patented Jan. 23, 1894.

Witnesses:

Inventor:
Theodor Bauer
by Archer duFaur
Attorney

UNITED STATES PATENT OFFICE.

THEODOR BAUER, OF BERLIN, GERMANY.

COKE-OVEN.

SPECIFICATION forming part of Letters Patent No. 513,257, dated January 23, 1894.

Application filed December 15, 1892. Serial No. 455,255. (No model.)

*To all whom it may concern:*

Be it known that I, THEODOR BAUER, a subject of the King of Bavaria, residing at Berlin, in the Kingdom of Prussia, Germany, have invented new and useful Improvements in Coke-Ovens, of which the following is a specification.

My invention has reference to improvements in horizontal coke-ovens and has for its special objects to simplify construction and repairs; to facilitate transfer of heat, and to enable the gases from any or all of the retorts to be led to the condenser or to be utilized directly.

The nature of my invention will best be understood when described in connection with the accompanying drawings, in which—

Figure 1:
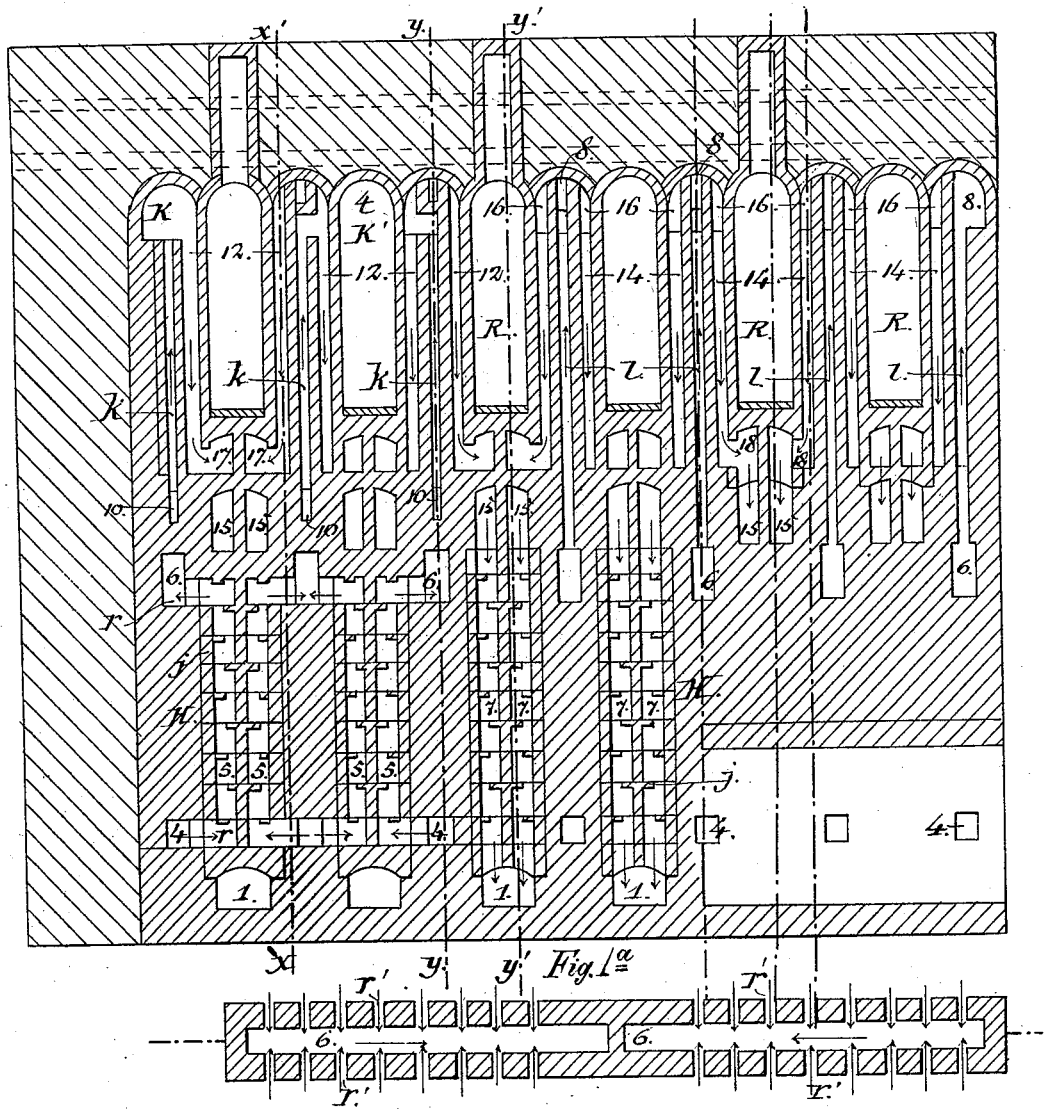
Figure 5:
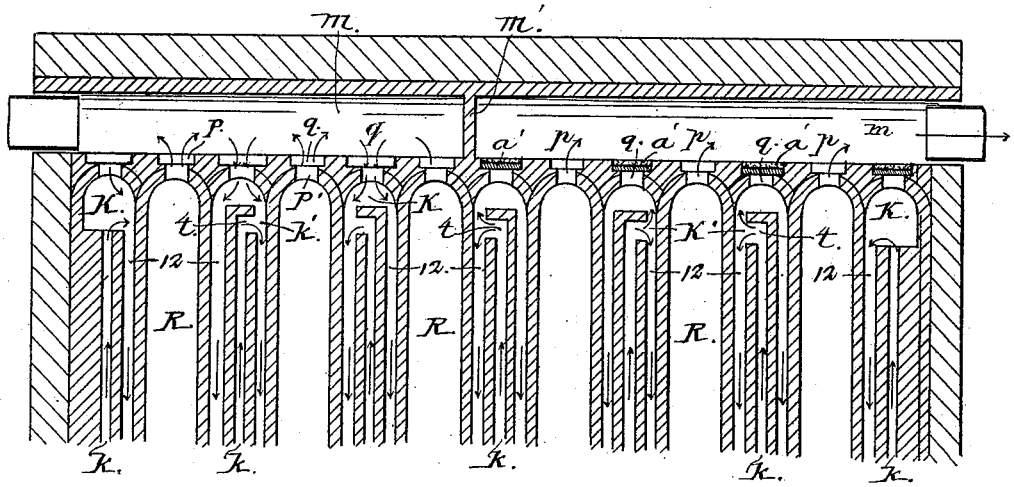
Figure 6:
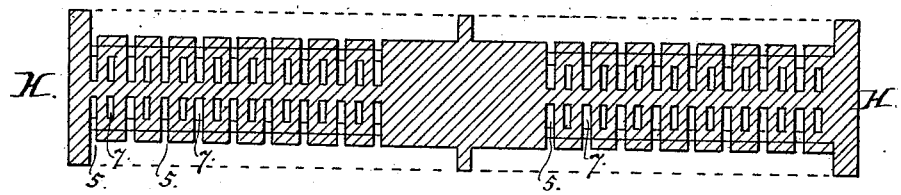
Figure 7:
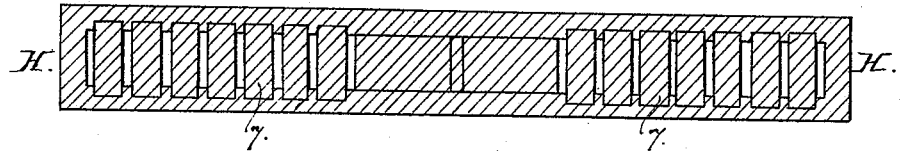

Figure 1 is a vertical section taken transversely through the retorts, air heating apparatus, and through the air passage. Fig. 1$^a$ is a horizontal section on the line $x\ x$. Fig. 2, of part of the hot air passages at the top of the air heating apparatus. Fig. 2 is a vertical section in the direction of the length of the retorts, taken on the line $y\ y$, Fig. 1. Fig. 2$^a$ is a horizontal section between two adjacent retorts on the line $z\ z$, Fig. 2. Fig. 3 is a vertical half section on the line $x'\ x'$, Fig. 1. Fig. 4 is a similar section on the line $y'\ y'$, Fig. 1. Fig. 5 is a vertical section transversely to the retorts taken on the line $z'\ z'$ Fig. 2. Fig. 6 is a horizontal section between two retorts on the line $x^2\ x^2$, Figs. 3 and 4. Fig. 7 is a similar horizontal section on the line $y^2\ y^2$, Figs. 3 and 4. Fig. 8 is a similar horizontal section on the line $z^2\ z^2$, Figs. 3 and 4.

Similar letters and figures indicate corresponding parts.

In the drawings the letters R R designate horizontal coking retorts of the usual construction, and H H are air heating apparatus constructed as follows:

4 are the cold air ducts located parallel to the retorts near the bottom of the air heating apparatus and supplied by a blower in the usual manner through a blast pipe 3 placed in a central passage V and provided with branches for the several ducts 4.

$r\ r$ are passages leading to the bottoms of the vertical air channels 5, which latter are built up substantially in zig zag form by ribbed blocks $j$ extending between the vertical walls and built into the same. These blocks form the alternate air channels 5 and the flame channels 7; the channels 5 being for the upward current of the incoming air, and the channels 7 for the downward current of the waste flame or products of combustion. By the peculiar arrangement of the separate ribbed blocks $j$ end or side joints are dispensed with and the blocks can be made in the form of thin ribbed slabs greatly facilitating the transfer of heat from the waste gases to the air. The air and gas are compelled to travel in a substantially zig-zag path by the ribs of the blocks. The channels 5 communicate at their tops with horizontal flues 6, into which latter open vertical flues $l$ connected at their tops with horizontal chambers 8 located at the sides and near the tops of the coking retorts R. At the outer ends of the chambers 8 are located combustion chambers K, suitable dampers S being placed between the two to regulate the flow of heated air.

At the top of the retorts R, Figs. 2 and 5, are formed two gas flues $m\ m$, each by preference divided into two longitudinal parts by a transverse partition $m'$. These flues communicate with the retorts R through passages $p$, and with the combustion chambers K through passages $q$. Provisions are made by dampers $a$ to control the gas—and any of the passages $q$ can be closed by tiles $a'$. The gas flues $m$ are placed in communication with a condenser (not shown) in the usual manner.

9 are the return pipes from the condenser extending along both sides of the oven and provided with branches entering horizontal flues 10 connected with vertical channels $k$ terminating at their tops in a chamber $t$ projecting into the combustion chambers K, and communicating therewith through a series of lateral openings $k'$ on both sides. This arrangement forms grate-like structures permitting the air to pass between the jets of gas issuing through the openings $k'$ and insures a perfect mixture. With the combustion chambers communicate downward flame flues 12, connected to horizontal passages 17 leading to upward flues 13, into passages 16. The latter passages communicate by downward flues 14, with similar passages 18 communicating with horizontal passages 15 extending over the air heating apparatus and communicating with the downward channels 7 of the same, which latter connect with chimney flues 1. The gases arriving from the condenser through the return pipes 9 pass into the flues 10 and upwardly through the channels $k$ located between the downward flame flues 12, and meet the hot air in the combustion chambers K. The flame resulting from the mixture of hot air and gas passes down through the flues 12, into the passages 17, thence up through the flues 13 located transversely on both sides of the upward air flues $l$ to passages 16; thence down through the flues 14, likewise located transversely on both sides of the upward air flues $l$, to the passages 18, through passages 15 into the downward zig-zag channels 7 and into flues 1 leading to the chimney. The cold air from the fan entering through cold air ducts 4 passes through the passages $r$ and enters the vertical zig-zag channels 5, through which it passes into the horizontal flues 6 and thence up through the flues $l$ to the combustion chambers K. In case of an interruption in the condensation, the operation of the furnace can be continued by cutting off the connections with the condenser. Gas is then admitted from the flues $m$ directly to the combustion chambers K through openings $q$ by opening the dampers $a$. By dividing the flues $m$ $m$ centrally as shown and described, one side of the ovens may be operated with, and the other without condensation. Also at the same time this permits the operation of one half of the ovens to be discontinued in case repairs are required, while the other half can remain in operation with or without condensation.

The air entering centrally and the air channels being located within the structure, leakage through the sides of the furnace is prevented. The arrangement shown also permits perfect control of the air supply, whereby a more perfect combustion and utilization of heat is effected—and also by placing the flame flues along the whole extent of the retorts and the vertical hot air flues between said flame flues, the heat is more effectually utilized.

What I claim as new, and desire to secure by Letters Patent, is—

1. In a coke oven plant, the combination of a series of horizontal retorts, combustion chambers located between the retorts at their outer ends and near the tops of the same, a series of vertical flame flues on the sides of the retorts, air heating apparatus located beneath the retorts, channels for leading cold air to and through the air heating apparatus, vertical hot air flues between the flame flues connected with the cold air channels, horizontal chambers between the combustion chambers, and communicating with the same and flues leading from the flame flues to and through the air heating apparatus and from the latter to the chimney, substantially as described.

2. In a coke oven plant, the combination of a series of horizontal retorts R, a series of air heating apparatus H beneath the retorts, a longitudinal central passage V, transverse air ducts 4, branching off from the latter, vertical zig-zag channels 5 connected to the ducts, horizontal flues 6 connecting with the tops of the channels 5, hot air chambers 8, vertical flues $l$ connecting the flues 6 with the chambers 8, combustion chambers K in connection with the chambers 8, gas supply channels $k$ communicating with the chambers K through openings $k'$, downward flame flues 12 extending along the retorts near their outer ends, a series of up and down flame flues 13 and 14 on both sides of the air flues $l$ connected with the flues 12, vertical zig-zag flame channels 7 alternating with the zig-zag air channels 5 and in connection at their tops with the flues 14 through horizontal passages 15 and 18, and at their lower ends with the chimney flues, substantially as described.

3. In a coke oven plant, a series of horizontal retorts, combustion chambers located between the retorts at their tops and at their outer ends, horizontal hot air chambers 8 located between the opposite combustion chambers and communicating with the same, flame passages 16 on opposite sides of the hot air chambers, downward flues 12, chambers $t$ projecting into the combustion chambers from below and communicating with the same through lateral openings $k'$ and vertical gas supply channels $k$ entering the chambers $t$, substantially as described.

4. In a coke oven plant, a series of horizontal retorts, combustion chambers located between the retorts at their tops and at their outer ends, horizontal hot air chambers 8 located between the opposite combustion chambers and communicating with the same, dampers S between the hot air chambers and combustion chambers, flame passages 16, on opposite sides of the hot air chambers, downward flues 12, chambers $t$ projecting into the combustion chambers from below and communicating with the same through lateral openings $k'$, and vertical gas supply channels $k$ entering the chambers $t$, substantially as described.

5. In a coke oven plant, a series of horizontal retorts, combustion chambers located between the retorts at their tops and at their outer ends, horizontal hot air chambers 8 located between the opposite combustion chambers and communicating with the same, flame passages 16 on opposite sides of the hot air chambers, downward flues 12, chambers $t$ projecting into the combustion chambers from below and communicating with the same through lateral openings $k'$, vertical gas supply channels $k$ entering the chambers $t$, gas flues $m$ $m$ located above the retorts, communications between said gas flues and combustion chambers and with the condenser, and means for controlling said communications to direct the gas either to the condenser, or directly to the combustion chambers, substantially as described.

6. In a coke oven plant, a series of horizontal retorts, combustion chambers located between the retorts at their tops and at their outer ends, horizontal hot air chambers 8 located between the opposite combustion chambers and communicating with the same, flame passages 16 on opposite sides of the hot air chambers, downward flues 12, chambers $t$ projecting into the combustion chambers from below and communicating with the same through lateral openings $k'$, vertical gas supply channels $k$ entering the chambers $t$, gas flues $m\ m$, divided by transverse partitions $m'\ m'$ and located above the retorts, communications between said gas flues and combustion chambers and with the condenser, and means for controlling said communications to direct the gas either to the condenser, or directly to the combustion chambers, substantially as described.

In testimony whereof I have signed my name to this specification in the presence of two subscribing witnesses.

THEODOR BAUER.

Witnesses:
 W. HAGEMANN,
 G. HÜLSMANN.